UNITED STATES PATENT OFFICE

JOSÉ BAXERES DE ALZUGARAY, OF NEW YORK, N. Y., ASSIGNOR, BY MESNE ASSIGN-
MENTS, TO MIDLAND ORES AND PATENTS COMPANY, OF NEW YORK, N. Y., A
CORPORATION OF MAINE.

ART OF EXTRACTING METALS FROM ORES.

1,041,407. Specification of Letters Patent. Patented Oct. 15, 1912.

No Drawing. Application filed September 21, 1907. Serial No. 393,975.

*To all whom it may concern:*

Be it known that I, JOSÉ BAXERES DE ALZUGARAY, a citizen of the Argentine Republic, residing in New York, county of New York, and State of New York, have invented a new and useful Improvement in the Art of Extracting Metals from Ores, of which the following is a description.

This invention relates to the art of extracting metals from ores, and especially to a wet, lixiviating process by which copper ores, containing gold and silver values, can be quickly and economically treated without previous roasting.

The objects of my invention are: to provide a process which eliminates all previous roasting of the ores; to provide a process by which exceptional efficiency and rapidity of the solvent action of the solution are obtained; to provide a process employing a solution the chemical constituents of which are cheap and which can be regenerated at insignificant cost and its efficiency completely restored; and to provide a process by which, when treatment of the ore has begun, reaction of the solution upon the ore will in part produce certain of the constituents of the solution, thus rendering treatment of a practically unlimited quantity of ore possible.

In my process, the ore is not previously roasted nor similarly treated; but, the metals are extracted from their ores by means of acidulated solutions of chlorids containing free chlorin obtained by the partial decomposition of the hydrogen chlorid in solution through the action of suitable oxidizing agents, and, in consequence, my invention applies to the treatment of all kinds of copper and silver ores, and to the extraction from those ores of the small amounts of gold usually present therein.

According to my process, the ore to be treated is preferably, though not necessarily, reduced to a desired degree of fineness, and then subjected to the action of a solvent solution which is allowed to saturate the same to the desired degree. The solution is then freed, by precipitation, from the excess of chlorids of metals dissolved from the ore, and subsequently regenerated by the action of oxidizing reagents. In extracting copper and its accompanying metals, a solution is formed of iron chlorids and copper chlorids (proto or perchlorids) together with an alkali chlorid or alkali-earth chlorid to which is added a suitable amount of hydrogen chlorid. When the ore has been for some time acted on by this solution, a suitable oxidizing agent is employed for liberating chlorin from the hydrochloric acid in the solution, so as to enable it to dissolve the gold contents, and also in order to peroxidize the iron protochlorids and the cuprous chlorid resulting from the action of the solution on the ore, thus also regenerating the initial solution, and restoring to it its full solvent properties. Among the existing agents which I may use to liberate free chlorin from the acid solutions are the alkali chlorids and alkali-earth perchlorates and hypochlorits, the chromates and bichromates, and the manganates and permanganates.

A characteristic solution for my purposes includes ferric chlorid, as an active chloridizing agent and, in conjunction therewith, certain solvent media for the copper or silver chlorids; cupric chlorid, as a second active chloridizing agent, which may be introduced as such or may be produced by certain reactions, such as those of ferric chlorid or hydrochloric acid in contact with the copper or copper compounds of the ore; an alkali chlorid, such as common salt, and the solution, as a whole, acidulated with hydrochloric acid. The functions of the salt and acid are mainly to increase the solvent capacity of the solution, though the hydrochloric acid is used as a source of chlorin and may be utilized as a reagent to assist in producing an initial supply of cuprous and cupric chlorid. The use of an alkali chlorid makes it possible to greatly decrease the amount of hydrochloric acid and of iron and copper chlorids which, otherwise, would be necessary, and as salt is cheap it affords an economical means of increasing the solvent capacity of the solution.

The solution in course of formation or after use may be modified and partially regenerated by introduction of regulated amounts of chlorin, or of oxygen. Chlorin may be introduced as such, or may be liberated from the constituent compounds through the action of an oxidizing agent. Alkali metal perchlorates, hypochlorates, chromates, bichromates, manganates, and permanganates added to the solution will also effect the same results. Where the oxidizing action is desired, it may be brought about by regulated exposure to the air or by the introduction of the oxidizing reagents, either initially applied or added from time to time, as desired.

The introduction of oxygen will serve to liberate chlorin and also to regenerate part of the ferrous chlorid forming ferric chlorid ($FeCl_2$) and ferric oxid ($Fe_2O_3$). The chlorin serves to regenerate chlorids and to assist in dissolving out silver and any gold that may be present in the ore.

In accordance with my invention, copper and silver sulfids, of an average composition as follows:

| | |
|---|---|
| Copper | 2.50% |
| Silver | 25 oz. |
| Gold | 5 dwt. | may be treated with a solution, containing in parts per 100, as follows:

| | |
|---|---|
| Ferrous and ferric chlorids | 10.00 |
| Cuprous and cupric " | 2.00 |
| Sodium " | 20.00 |
| Hydrochloric acid, 20° B. | 4.00 |
| | 36.00 |
| Water | 64.00 |
| Sodium manganate | .100 |
| | 100.100 |

Through the action of the above solution the greater portion of the copper and silver sulfids will be rapidly converted into cuprous, cupric and silver chlorids, and silver chlorid will be thus rendered soluble by the sodium chlorid and hydrochloric acid, some cupric sulfate being also formed, owing to the oxidation of the copper sulfids forming the ore.

Under the influence of oxygen from the air, together with heat, the perchlorid of iron evolves chlorin, the amount of chlorin being rendered thus free being increased and maintained at its constant, or full, strength by the addition of small amounts of oxidizing agents.

The ferric and cupric chlorids, after acting on the ore, are reduced to protosalts. When the solvent solutions have reached this state they are peroxidized and, consequently, regenerated by injecting chlorin into the waste liquors. The process is thus rendered continuous, and the liquors can be used to treat fresh amounts of ores.

In carrying out my invention and working my process, the solutions can be used cold or hot; but, if the latter, the extraction of the metallic contents in the ore is more rapid. By my process, the ores may be treated in bulk, or in heaps, in vats or wooden receptacles; and the solution, holding the copper, gold and silver values in solution, is treated by means of iron to obtain copper cement containing also silver and gold, or by means of any suitable precipitate such as sulfureted hydrogen.

In the foregoing description, it has been deemed unnecessary to set forth fully all the possible interplay of chemical and molecular relations in the solutions; but, to those skilled in the art, it will be evident that the constituents of the solution and their peculiar inter-relation constitute a true combination of the greatest efficiency. Hence, while certain substitutions of specific compounds may be found to be possible and practicable in certain cases without destroying the useful balance and interplay of chemical forces, the substitutions should be limited to such as will not interfere with or destroy the characteristic relations. In general, with reference to the copper solution, when fully formed and applied to the ore to effect the chloridizing of the solution in accordance with this invention, comprises essentially an active perchlorid, such as ferric chlorid; also an active perchlorid of the metal to be extracted from the ore; and also solvent media for the hydrochlorids resulting from the chloridizing action. In case of silver and copper, the second chloridizing agent and the hydrochlorid must be cupric and cuprous chlorids, respectively, and for the extraction of silver the copper chlorid must be present initially, because it is the cupric chlorid that is mostly active in dissolving the silver, and it is the cuprous chlorid which is the principal media for the dissolved silver chlorid.

Having thus described my invention, what I claim and desire to secure by Letters Patent is:

1. The process for treating copper, silver and gold ores consisting in subjecting a pulverized mass of ore to the action of a mixture of acidulated alkali and metallic chlorids, to which a suitable amount of a chlorate or a perchlorate is added to effect the solution of the precious metals.

2. The process for treating copper, gold and silver ores consisting in reducing the ores to a pulverent state and then subjecting the reduced mass to the action of an acidulated solution of chlorids, perchlorids and perchlorates of the alkali and heavy metals.

3. The process for treating copper, gold and silver ores consisting in reducing the ores to a pulverulent state, and then subjecting the reduced mass to the action of a solution of an alkali chlorid, such as sodium chlorid, a chlorate such as sodium chlorate, metallic chlorids such as copper and iron chlorids, and the whole acidulated with hydrochloric acid.

In testimony whereof I have hereunto signed my name in the presence of two subscribing witnesses.

JOSÉ BAXERES DE ALZUGARAY.

Witnesses:
FLORENCE ATEN IVES,
CHAS. McC. CHAPMAN.